June 12, 1951   C. A. SCHEELER   2,556,449
PIVOT JOINT
Filed Jan. 5, 1946
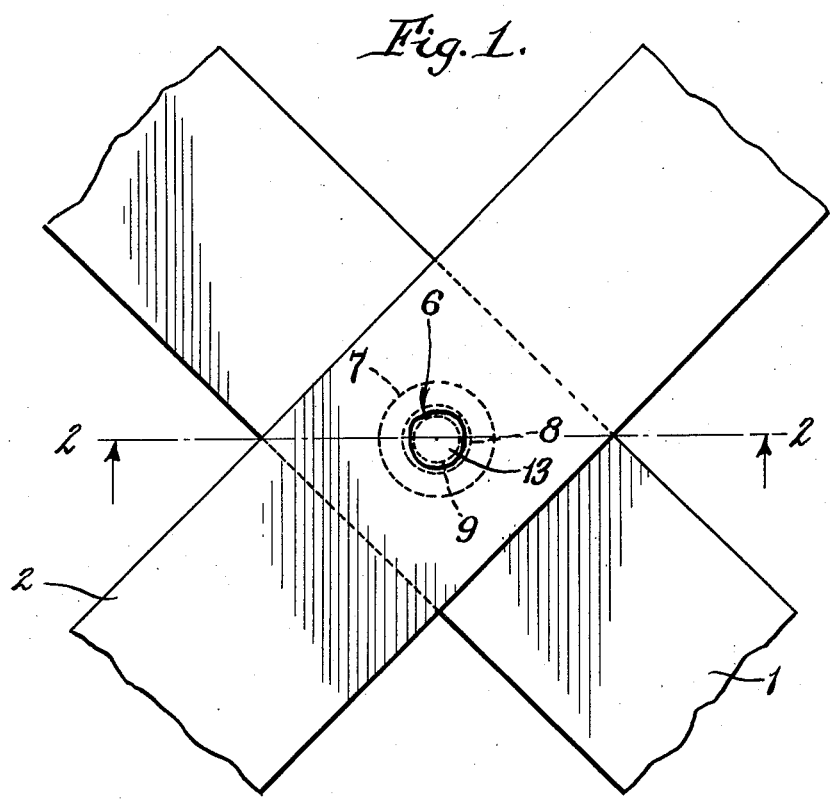
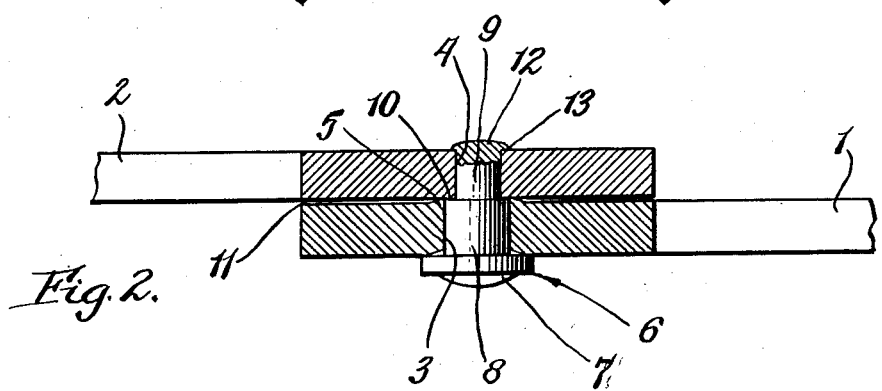
INVENTOR.
Charles A. Scheeler
BY Popp and Popp
Attorneys.

UNITED STATES PATENT OFFICE 2,556,449

PIVOT JOINT

Charles A. Scheeler, Buffalo, N. Y., assignor to Buffalo Wire Works Co., Inc., Buffalo, N. Y., a corporation of New York Application January 5, 1946, Serial No. 639,482

2 Claims. (Cl. 16—168)

This invention relates to a pivot joint and more particularly to a simple one-piece pivotal connection for connecting two moving parts, the pivot joint being particularly applicable for use in a structure having a multiplicity of pivot joints, such as in a folding lattice gate or the like.

One of the objects of the present invention is to provide a simple one-piece pivot which can be rapidly secured to the parts to be connected.

Another object is to provide such a pivot joint in which an accurate fit is obtained and in which in particular neither binding nor excessive looseness occurs. With straight rivets it is almost impossible, in commercial practice, to secure a series of rivets, either by heading or by welding without having some of the rivets loose and the others tight, this causing a folding lattice gate to be stiff in its operation and at the same time rattly.

Another important object of the invention is to provide such a pivot joint in which the faces of the parts connected together are maintained in spaced relation and which at the same time avoids the use of washers or other similar separators for this purpose, the placement of spacing washers being a fussy and tedious operation. By maintaining the parts in spaced relation the painted or otherwise finished faces of the pivotally connected parts are not scraped against each other as the parts are moved about the pivotal connection.

Another object of the invention is to provide such a simple pivot joint in which there is no danger of misalignment of the pivot pin, such misalignment being avoided by the shape of the pivot pin and by the fact that it is welded and hence is not subjected to heavy forces.

Another object is to provide such a pivot pin which, by welding, eliminates all stamping or rivet heading apparatus in securing the pivot to the parts to be connected.

A further aim is to provide such a pivot joint which requires no substantial manual or mechanical effort in application to the parts to be connected.

Another object is to provide such a pivot joint which permits of using smaller pivot pins than must be used where the pivot pin is required to be provided with a head in securing it in place.

Another aim is to provide such a pivot joint in which the pivot pin, by welding, is integrally united with one of the parts to be connected and has any desired bearing fit with the other part to be connected. By this means a broad and accurate bearing surface can be provided and there is no danger of wear at other points, such as at the edge of the upset of a headed rivet.

Another object is to provide such a pivot joint which is low in cost, both in the cost of the pivot pins used and also in the cost of applying the pivot pins to the parts to be connected.

Another object is to provide such a pivot joint which will not loosen or come apart in service.

Another object is to provide such a pivot joint which will stand up under conditions of severe and constant use without failure.

In the accompanying drawings:

Fig. 1 is a side elevation of a pair of bars connected by a pivot joint embodying the present invention.

Fig. 2 is an enlarged section, taken on line 2—2, Fig. 1.

The pivot joint forming the subject of the present invention was particularly designed for use as a simple pivot in connecting parts together at a multiplicity of places and in which the resulting structure is bulky and hence difficult to fabricate. Such a structure would be a latticework gate composed of a multiplicity of crossed bars which are pivotally connected at each cross-over so that the gate is capable of being drawn out to an unfolded condition in closing the gate or collapsed to a folded condition in opening the gate.

In the accompanying drawings the numeral 1 represents one of the bars of such a folding gate and the numeral 2 represents another bar of such a folding gate, these bars being connected together by the pivot pin embodying the invention. To receive this pivot pin the bar 1 is provided with a relatively large hole 3 therethrough and the bar 2 is provided with a registering relatively small hole 4 therethrough. An important feature of the present invention resides in the provision of an anular offset 5 around the relatively large hole 3 therein, this annular offset being toward the bar 2 and being provided by a punch engaging the metal at the edge of the hole 3 on the opposite side from that which is to face the bar 2. This annular offset 5 insures the spacing, as indicated at 11, of the bars 1 and 2 from each other, so as to avoid scraping of their opposed faces and also insures the proper fit of the pivot pin, as hereinafter described.

This pivot pin, indicated generally at 6, is shown as having a preformed head 7 at one end and adjacent this head its shank is provided with an enlarged cylindrical part 8 which fits into the larger hole 3 of the bar 1. The shank of the pin 6 is also provided with a reduced cylindrical part 9 which fits into the smaller opening 4 of the bar 2. The pivot pin 6 is inserted from the indented side of the bar 1 and its enlarged cylindrical part 8 is proportioned to extend to the extremity of the annular offset part 5.

An important feature of the invention resides in the means for securing the pivot pin 6 permanently in place. In accordance with the invention, after the pivot pin 6 has been inserted its reduced end 12 is touched with the electrode (not shown) of a spot welder so that a weld 13 is provided between the shank of the rivet and the bar 2. This weld is produced in the usual and well known manner by including the bar 2 in the circuit of the welding electrode.

In the practice of the invention the many pivot pins 6 are inserted at the several joints, these pivots being inserted from the indented sides of the bars 1. To secure the rivets all that is needed is to successively touch the ends 12 of the several pivot pins with a welding electrode. This serves to integrally unite the extremity 12 of each pivot pin with the corresponding bar 2 so that the pins turn with the bar 2. This insures that the bearing for the pivot is between the enlarged hole 3 in the bar 1 and the enlargement 8 of the pivot pin. This not only provides a large bearing surface but also bearing surfaces which can be accurately fitted at little cost.

Further, by proper design of the pivot pins there is no danger of binding or of having excessive lateral looseness at the joint. Thus, the pivot pin is integrally united with the bar 2 and the bar 1 is laterally supported on one side by the preformed head 7 of the rivet and on its opposite side by the annular offset 5. Hence by accurately predetermining the axial length of the enlarged part 8 of the rivet the proper lateral fit can be provided to insure against excessive binding or lateral looseness of the pivot joint. With the straight rivet as the pivot joint it is almost impossible to set a series of pivots without having some excessively loose and others binding.

It will also be seen that the offset 5 provides the space 11 between the bars 1 and 2 which is necessary to prevent these bars from scraping against each other and injuring the paint or other finish of the bars. The simple annular offset 5 thereby permits of eliminating all washers or other separate spacing members to accomplish this purpose. Washers are not only undesirable in the finished structure, as compared with the simple annular offset 5, but are also tedious and difficult to apply, particularly with a large bulky structure, such as a latticework gate. By welding the pivot pins in the manner described, in addition to obtaining the proper pivotal fit without danger of misalignment, excessive looseness or binding, the construction of the pivoted structure is greatly simplified inasmuch as mechanical heading of the pivot pin would necessarily be much slower and very difficult, particularly where a large and cumbersome structure, such as a folding latticework gate, is being handled. The ease of merely touching the ends of the pivot pins to secure them in position will readily be appreciated in addition to the mechanical advantages obtained by this method of securing these pins.

From the foregoing it will be seen that the present invention provides a very simple and easily fabricated pivot joint which can be produced very quickly and at very low cost and at the same time can readily be produced free from binding or excessive looseness and has adequate bearing surface to withstand severe and constant use.

I claim as my invention:

1. A pivot joint between two flat bars arranged in face-to-face relation, comprising a pivot pin having an enlarged head at one end and having its shank at the opposite end reduced and spaced from said head, the portion of said shank adjacent said head rotatably fitting a relatively large hole extending transversely through one of said bars with said head in engagement with the outer flat face of said one of said bars, and said reduced portion of said shank fitting a relatively small hole extending transversely through the other of said bars, and a weldment integrally uniting the extremity of said reduced portion of said shank with said other of said bars whereby said portion of said shank adjacent said head and the surface of said relatively large hole provide the bearing surfaces for the pivot joint.

2. A pivot joint between two flat bars arranged in face-to-face relation, comprising a pivot pin having an enlarged head at one end and having its shank at the opposite end reduced and spaced from said head, the portion of said shank adjacent said head rotatably fitting a relatively large hole extending transversely through one of said bars with said head in engagement with the outer flat face of said one of said bars, and said reduced portion of said shank fitting a relatively small hole extending transversely through the other of said bars, a weldment integrally uniting the extremity of said reduced portion of said shank with said other of said bars whereby said portion of said shank adjacent said head and the surface of said relatively large hole provide the bearing surfaces for the pivot joint, and an integral annular offset provided on said one of said bars around said relatively large hole therethrough and extending axially of said holes toward the other of said bars having the smaller of said holes to provide a spacer between the two bars and thereby protect the opposing faces thereof.

CHARLES A. SCHEELER.

REFERENCES CITED

The following references are of record in the file of this patent:

UNITED STATES PATENTS

| Number | Name | Date |
|---|---|---|
| 854,392 | Wells | May 21, 1907 |
| 1,835,129 | Woernle | Dec. 8, 1931 |
| 1,871,126 | Morley | Aug. 9, 1932 |
| 2,137,529 | Ferris | Nov. 22, 1938 |
| 2,347,329 | Morrow | Apr. 25, 1944 |